April 9, 1963  A. W. ANDERSON  3,084,582
ROTATABLE SHEARING BLADES FOR PROGRESSIVE TRANSVERSE CUTTING
Filed Dec. 10, 1958  2 Sheets-Sheet 1
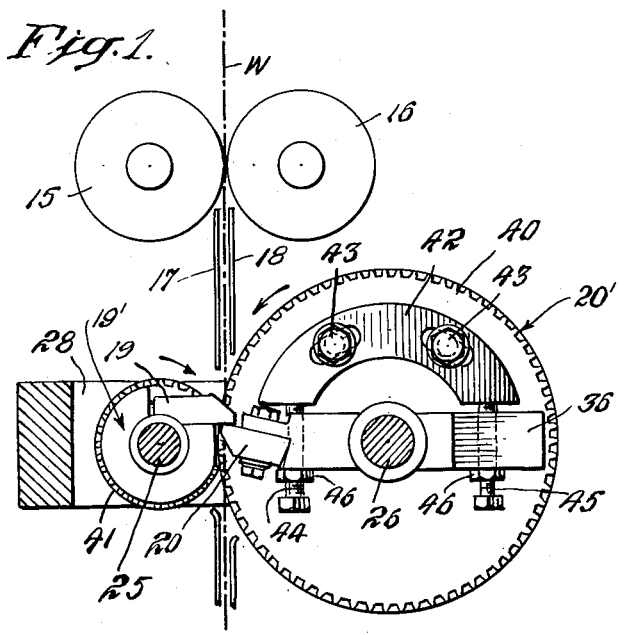
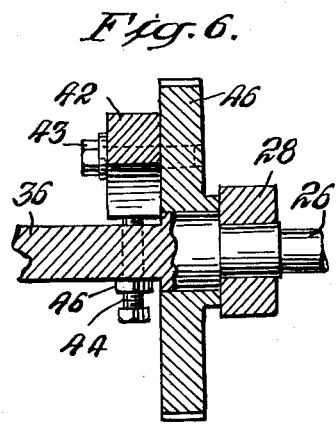
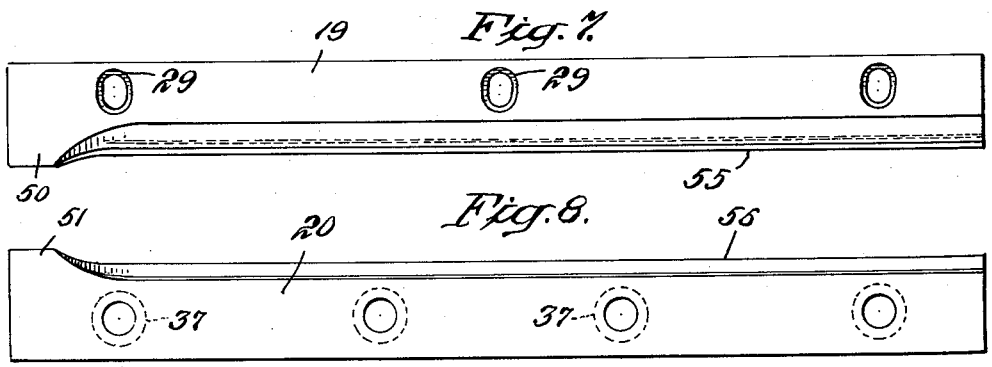
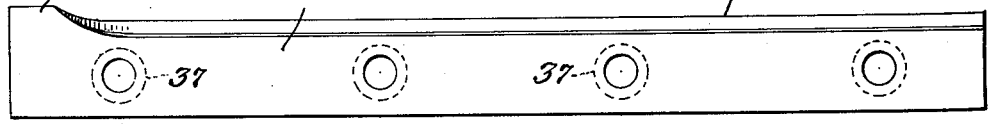
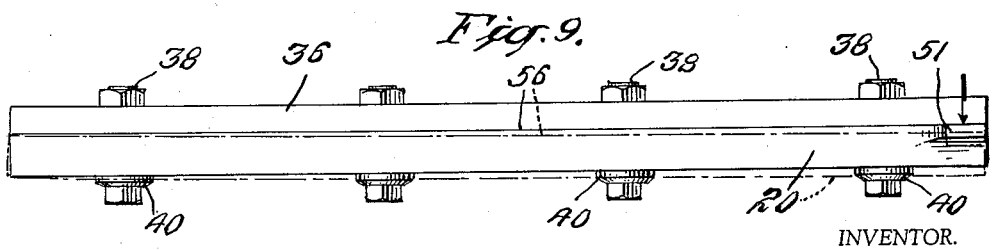
INVENTOR.
ANDREW W. ANDERSON
BY
Luther W Hawley
ATTORNEY INVENTOR.
ANDREW W. ANDERSON
BY
Luther W. Hawley
ATTORNEY United States Patent Office 3,084,582
Patented Apr. 9, 1963

3,084,582
ROTATABLE SHEARING BLADES FOR PROGRESSIVE TRANSVERSE CUTTING
Andrew W. Anderson, West Caldwell, N.J., assignor to Scandia Packaging Machinery Company, North Arlington, N.J., a corporation of New Jersey
Filed Dec. 10, 1958, Ser. No. 779,373
3 Claims. (Cl. 88—341)

This invention relates to cutting or severing means.

More particularly stated, the invention relates to mechanism for cutting a sheet or web of material, such as metal foil. It has been found difficult to make a clean sharp cut in a strip or web of metal foil by cutting or shear blades since the cutting edges are not positively controlled and guided so that they properly register when they engage and cut the web.

This invention has for its salient object to provide positively acting means for insuring the proper registration of cutting edges of cutting or shear blades when the sheet or web to be cut is engaged and cut thereby.

Another object of the invention is to provide adjustable means for insuring the proper registration of and the desired pressure of a pair of coacting cutting blades at the time the cutting action takes place.

Another object of the invention is to provide means for preventing abutting engagement of shear blades during their cutting operation.

Another object of the invention is to provide means for insuring the withdrawal of the cutting blades after the cutting action without injury to the cutting edges.

Further objects of the invention will appear from the following specification taken in connection with the drawings which form a part of this application, and in which—

FIG. 1 is a vertical sectional elevation showing cutting mechanism embodying the invention, this view being taken substantially on line 1—1 of FIG. 2, looking in the direction of the arrows;

FIG. 6 is a sectional elevation taken substantially on line 6—6 of FIG. 2, looking in the direction of the arrows;

FIG. 7 is a plan view of one of the cutting blades;

FIG. 8 is a plan view of the other cutting blade; and

FIG. 9 is an elevational view of the two blades as they move into cutting relation.

Figure 2:
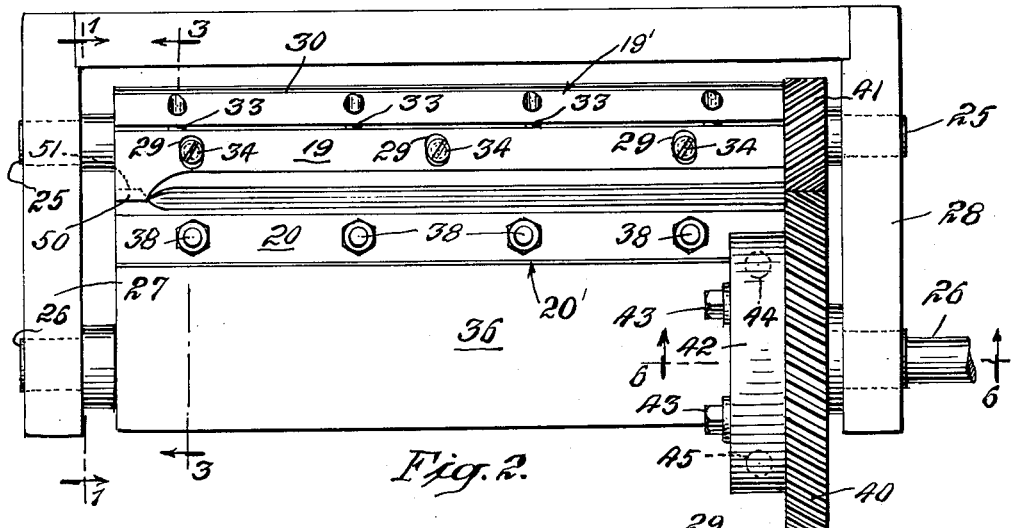
FIG. 2 is a top plan view of the cutting mechanism.

In the embodiment of the invention illustrated in the drawings, FIG. 1 shows a web of material W, such as metal foil, being fed between a pair of feed rolls 15 and 16 through guides 17 and 18 to cutting mechanism comprising a pair of cutting blade assemblies indicated generally at 19' and 20' including cutting blades 19 and 20, respectively.

The cutting blades, as shown in FIGS. 1 and 2, are respectively carried by spindles or trunnions 25 and 26, which are mounted in frame members 27 and 28, respectively. The blade 19 is mounted on a cylindrical block 30 carried by the spindles or trunnions 25. The block is slabbed off, as shown at 31, and has a recess 32 in which the blade 19 is mounted. The blade can be adjusted by a set screw 33 and is held in adjustable position by screws 34 which seat in slots 29 in the blade 19.

The blade 20 is mounted in a recess 35 in a mounting bar 36 which is integral with the spindles or trunnions 26.

The blade 20 has a recess 37 and is held in the recess by bolts 38, springs 39 being seated in the recess and against the heads 40' of the bolts 38. The recess 35 is L-shaped; see FIGS. 2–4, and includes a planar surface 35' against which the planar surface 20" of the blade 20 is normally urged and seated by springs 39. The recess 35 includes a surface 35" substantially normal to surface 35', and the adjacent surface 20''' of the blade 20 extends at an acute angle from the planar surface 20" to form a clearance or relief angle $a$. The intersection $i$ between the surfaces 20" and 20''' forms a pivot portion $p$ for the blade 20 at the intersection between the surfaces 35' and 35".

This relief angle, as will be readily apparent, will permit the blade 20 to move slightly away from the blade 19 during initial engagement between the blades to thus obviate excessive wear on the engaging blade portions.

The trunnion 26 has mounted thereon a spiral gear 40 which meshes with a spiral gear 41 on the spindle or trunnion 25. In FIG. 1 it will be noted that an arcuate plate 42 is adjustably secured to the spiral gear 40 by means of bolts 43 which extend through slots 43' in the plate 42.

The bar 36 has bolts 44 and 45 which extend through the bar and engage the ends of the arcuate plate 42 and thus secure the spiral gear for rotation with the bar and the blade 20. Lock nuts 46 secure the bolts 44 and 45 in adjusted position. By loosening one of the bolts and tightening the other, the blade 20 can be adjusted so as to engage the blade 19 with the desired pressure during the cutting operation.

Figure 3:
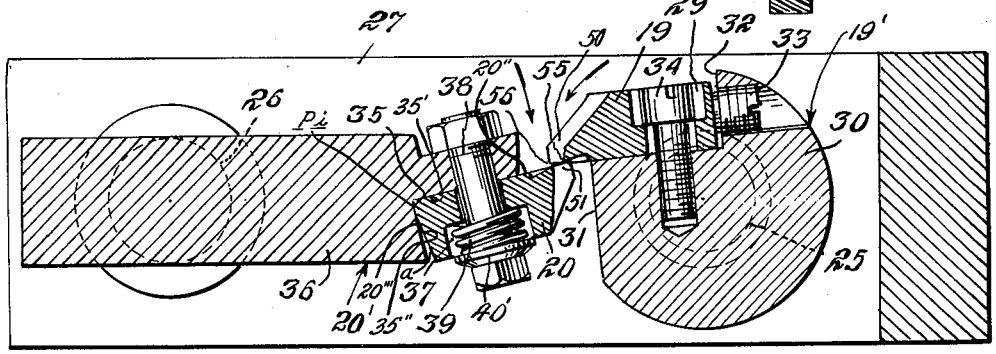
FIG. 3 is a transverse sectional elevation, on an enlarged scale, taken substantially on line 3—3 of FIG. 2, looking in the direction of the arrows, and showing the blades prior to their cutting position.
Figure 4:
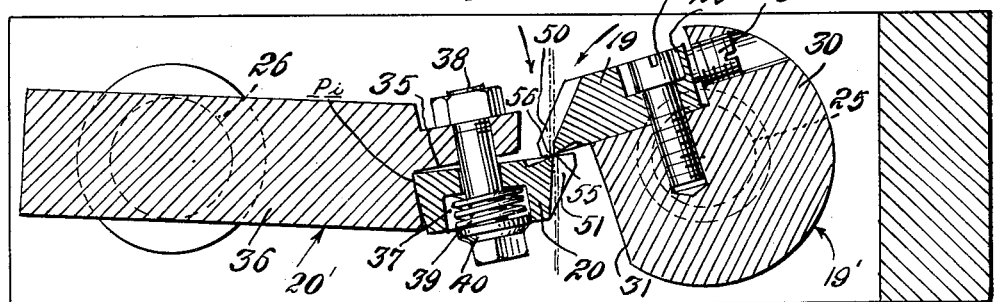
FIG. 4 is a view similar to FIG. 3 but showing the cutting blades in cutting position.
Figure 5:
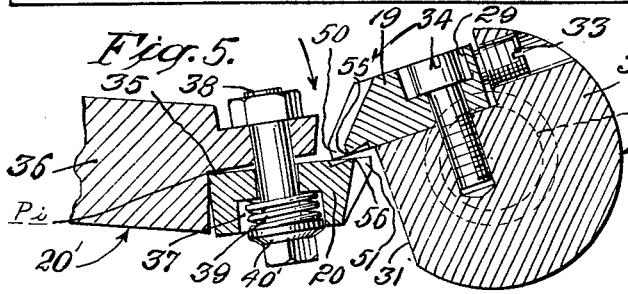
FIG. 5 is a view similar to FIGS. 2 and 3 but showing the blades in the act of withdrawal from cutting position.

In order to insure proper registration of the cutting blades in the manner illustrated in FIGS. 3, 4 and 5 and to insure a sharp, clean cut of the web of material passing therebetween, each blade has on one end a projection or tooth, these projections being designated 50 and 51 in FIGS. 7 and 8. The action of these teeth or projections is illustrated in FIGS. 3, 4 and 5. In FIG. 3 the teeth are in engagement prior to the engagement of the cutting edges 55 and 56 of the blades 19 and 20. In FIG. 4 the engagement of these projections or teeth has caused the blade 20 to be depressed against the action of the springs 39 and the cutting edges 55 and 56 have moved into cutting position. Since the projections 50 and 51 are provided at one end only of the blades, the depression of the blade 20 against the action of the springs will take place longitudinally of the blades and progressively, thus giving a slight shearing action to the blades during the cutting action. It will be noted that initial engagement between teeth 50, 51 will initially cause the blade 20 to pivot at P from the position shown in FIG. 2 to that of FIG. 3, the blade moving through the relief angle $a$ and preventing shock and damage to the blade during initial engagement and yet permitting subsequent longitudinal and progressive shear along the length of the respective blades, this longitudinal shear occurring after the adjacent surfaces 20''' and 35" are in abutting engagement as seen in FIG. 4.

After the web has been cut by engagement of the cutting edges 55 and 56, as shown in FIG. 4, the continued rotation of the blades will hold the blade 20 in depressed relation as the projections continue in engagement and move away from each other, so that the cutting edge 55 will clear the cutting edge 56 and any injury to the cutting edges will be prevented.

It will be noted that the gears 40, 41 provide a positive mechanical drive between blade assemblies 20, 19 and the adjusting screws 45 in cooperation with the bar 36 and arcuate plate 42 provide means for adjusting initial contacts or timing the moment of engagement between teeth 50, 51, i.e. compensating for gear tooth inaccuracies which might cause late or early engagement between the teeth 50, 51, thus permitting an accurate adjustment for the length of the sheets of material to be severed from web W during each complete revolution of gear 40.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A cutting mechanism for sheets or web material comprising a support frame, a pair of cutting blade assemblies rotatably supported on said frame on spaced, parallel axes of rotation, one of said cutting blade assemblies including an elongated mounting bar extending diametrically through the axis of rotation thereof, a blade juxtaposed on one side of said mounting bar and extending substantially parallel to said axes of rotation, fastening means extending transversely between said mounting bar and blade and including spring means engaging one side of said blade and normally urging the blade toward said mounting bar, said blade being free at its ends, said other cutting blade assembly including a blade extending substantially parallel to said axes of rotation and projecting toward said first mentioned blade, said blades including linear cutting edges extending substantially the length thereof and having arcuate paths of intersection for shearing a web or sheet disposed therebetween, said blades including only at one end abutment means projecting radially beyond the linear cutting edges thereof and engageable prior to intersection of said linear cutting edges of said blades during simultaneous rotation of said blade assemblies for causing said spring-urged blade to be longitudinally and progressively tilted in shearing action progressively along said blades, said mounting bar including a substantially planar support surface against which said first mentioned blade is urged by said spring means, said mounting bar including an abutment surface substantially normal to said planar support surface, said first cutting blade including a planar support surface engaging said mounting bar support surface and a rear abutment surface at an acute angle to said first blade planar surface and opposite the cutting edge thereof, said spring means normally urging the planar surfaces of said mounting bar and first cutting blade into juxtaposed relation and disposing the rear abutment surface of said first cutting blade in angular relation with respect to the abutment surface of said mounting bar, said support and abutment surfaces of said mounting bar intersecting to define a pivot line portion to permit said first cutting blade to pivot away from said mounting bar support surface at said pivot line portion on an axis substantially normal to the longitudinal axis of said first blade when initial contact occurs between said cutting blade abutment means whereby the progressive shearing action subsequently occurs.

2. The structure of claim 1 including intermeshed gear elements circumposed about the axes of rotation of said cutting blade assemblies for affording positive and simultaneous movement therebetween, said mounting bar being journaled for independent movement about the axis of rotation of said one cutting blade assembly, and adjustable abutment means mounted on the gear element of said one cutting assembly and said mounting bar for timing engagement between said cutting edges of said blades.

3. The structure of claim 2 wherein said adjustment means comprises an abutment plate adjustably mounted on the gear element of said one cutting blade assembly for movement concentric to the axis of rotation of said one cutting blade assembly, and adjustable abutment elements suitably mounted on said mounting bar in diametrically opposed relation with respect to said axis of rotation of said one cutting blade assembly and engageable with a diametrically opposed portion of said abutment plate.

References Cited in the file of this patent

UNITED STATES PATENTS

| 162,607 | Biedinger | Apr. 27, 1875 |
| 371,579 | Harding | Oct. 18, 1887 |
| 1,398,474 | Strawn | Nov. 29, 1921 |
| 2,142,213 | Sauerman | Jan. 3, 1939 |
| 2,379,740 | Palmer | July 3, 1945 |
| 2,387,767 | Nordquist | Oct. 30, 1945 |
| 2,439,671 | Ott | Apr. 13, 1948 |
| 2,982,066 | Thompson | May 2, 1961 |

FOREIGN PATENTS

| 735,381 | Great Britain | Aug. 17, 1955 |